(12) United States Patent
Minami et al.

(10) Patent No.: US 7,580,588 B2
(45) Date of Patent: Aug. 25, 2009

(54) IMAGE PROCESSING APPARATUS, IMAGE READING APPARATUS, AND IMAGE FORMING APPARATUS

(75) Inventors: Takahiro Minami, Yamato-Koriyama (JP); Satoshi Morimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 535 days.

(21) Appl. No.: 11/535,528

(22) Filed: Sep. 27, 2006

(65) Prior Publication Data

US 2007/0120989 A1   May 31, 2007

(30) Foreign Application Priority Data

Nov. 25, 2005   (JP) .............. 2005-340499

(51) Int. Cl.
*G06K 9/40* (2006.01)
(52) U.S. Cl. .............. 382/274; 382/260; 382/275; 358/3.26; 358/3.27
(58) Field of Classification Search .......... 382/274, 382/275, 282; 358/3.26, 3.27, 463
See application file for complete search history.

(56) References Cited

U.S. PATENT DOCUMENTS 5,775,918 A * 7/1998 Yanagida et al. .......... 434/353
5,796,928 A * 8/1998 Toyomura et al. .......... 358/1.6
5,933,255 A * 8/1999 Hirata et al. ............. 358/501
5,959,650 A * 9/1999 Fukui et al. ............. 347/132
6,008,911 A * 12/1999 Fukui et al. ............. 358/518

FOREIGN PATENT DOCUMENTS

| JP | 2001-094734 | 4/2001 |
| JP | 2001-268325 | 9/2001 |
| JP | 2001-309136 | 11/2001 |
| JP | 2003-125179 | 4/2003 |

* cited by examiner

*Primary Examiner*—Yosef Kassa
(74) *Attorney, Agent, or Firm*—Renner, Otto, Boisselle & Sklar, LLP

(57) ABSTRACT

An apparatus includes a CCD that reads a script image, an analog front end unit (AFE) that adjusts the offset and the gain of an image signal and A/D-converts the image signal, an image processing IC that applies image processing such as shading correction, input gamma correction, color correction, MTF correction, output gamma correction to the digital image signal, and a spread spectrum frequency IC that generates a spread spectrum clock based on a source oscillation clock, wherein the former block of the image processing unit is driven with the source oscillation clock and the latter block is driven with the spread spectrum clock. The image signal is transferred asynchronously from the former block to the latter block through an external memory controller.

11 Claims, 7 Drawing Sheets

SOURCE OSCILLATION CLOCK

SPREAD SPECTRUM FREQUENCY CLOCK

IMAGE PROCESSING APPARATUS, IMAGE READING APPARATUS, AND IMAGE FORMING APPARATUS

CROSS-NOTING PARAGRAPH

This Nonprovisional application claims priority under 35 U.S.C. §119 (a) on Patent Application No. 2005-340499 filed in JAPAN on Nov. 25, 2005, the entire contents of which are hereby incorporated herein by references.

FIELD OF THE INVENTION

The present invention relates generally to an image processing apparatus, an image reading apparatus, and an image forming apparatus that are applicable to a scanner, a digital copying machine, a digital color copying machine, a facsimile machine, etc., and, more particularly, to an image processing apparatus, an image reading apparatus, and an image forming apparatus that cause an image processing IC, that executes signal processing of an image that has been read, to operate with a clock at a specific frequency and a spread spectrum clock and reduce EMI without degrading the image quality.

BACKGROUND OF THE INVENTION

With the higher speed and the higher density of electronic devices in recent years, EMI (Electro Magnetic Interference) from the electronic devices only been increased. Because EMI radiated from an electronic device influences other electronic devices, EMI is restricted by various standards and, to meet these standards, a spread spectrum clock technique that effectively reduces EMI noises is getting more important.

For an image reading apparatus applicable to a scanner, a digital copying machine, a digital color copying machine, a facsimile machine, etc., known techniques concerning EMI countermeasures thereof can be those disclosed in Japanese Laid-Open Patent Publication Nos. 2001-94734 and 2001-268325. According to these techniques, a CCD is used that photo-electrically converts a reflected light beam from a script to be read into image data, a source oscillation clock is used as a signal to control an analog front end (AFE) that adjusts the offset and the gain of the image data, and image processing units other than the above use a spread spectrum clock that is frequency-spread.

More specifically, an image reading apparatus disclosed in Japanese Laid-Open Patent Publication No. 2001-94734 is adapted to divide a timing circuit of the image reading apparatus into an analog signal processing system clock generating circuit and a digital signal processing system clock generating circuit, to use in the analog signal processing system clock generating circuit a reference clock from a reference clock generator, and to use in the digital signal processing system clock generating circuit a spread spectrum clock from a spread spectrum clock generator.

An image reading apparatus disclosed in Japanese Laid-Open Patent Publication No. 2001-268325 is adapted to divide a timing signal generating unit of the image reading apparatus into an analogue signal processing system clock generating unit and a digital signal processing system clock generating unit, to be able to select a modulation width optimal for each system, that is, a modulation width by differing the modulation width of a spread spectrum clock generated by a spread spectrum clock generating unit and, therefore, to be able to suppress generation of image noises, and to be able to obtain an EMI reduction effect.

In a scanner unit of an image reading apparatus, a linear image sensor (CCD) and an analog front end (AFE) that handle an analog signal need to be operated with a clock at a specific frequency. However, a clock at a specific frequency is disadvantageous against the regulations concerning the EMI countermeasures and, therefore, it is general to use a spread spectrum clock for a digital signal processing section.

Similarly, in each of the image reading apparatuses disclosed in Japanese Laid-Open Patent Publication Nos. 2001-94734 and 2001-268325, a CCD and an analog front end that handle an analog signal are operated with a clock at a specific frequency and an image processing section that handles a digital signal is operated with a spread spectrum clock.

However, although the frequency of the clock at a specific frequency and the frequency of the spread spectrum clock are equal when they are averaged, the timing in each cycle is not necessarily same and, therefore, in synchronized transferring, difference is generated between the term during which a pre-stage of image processing holds data and a timing at which a post-stage of the image processing captures the data. An image processing circuit is designed taking a margin such that data can be accurately delivered even when difference is generated between the timings. However, the designing becomes difficult as further higher performance concerning the resolution, the gray scale, and the reading speed is demanded and the transferring speed becomes higher. Therefore, it is difficult to secure sufficiently the timing for latching an image signal that is inputted from the analog front end (AFE) into an image processing IC including an ASIC, etc., in the post-stage.

SUMMARY OF THE INVENTION

Noting the circuit configuration of an image processing circuit positioned in the post-stage of an analog front end, the circuit configuration being divided into a former block and a latter block, the object of the present invention is to provide an image processing apparatus that can facilitate reduction of image noises and reduction of EMI and can latch easily and securely an image signal when the apparatus transfers the image signal from the former block to the latter block at a high speed.

Another object of the present invention is to provide an image processing apparatus for which the need to be provided with an asynchronous circuit is avoided by causing an external memory controlling circuit to intervene between the former block and the latter block when the apparatus transfers the image data from the former block to the latter block at a high speed.

Yet another object of the present invention is to provide an image processing apparatus that includes a photoelectric converting unit that reads a script image; an analog front end unit that adjusts the offset and the gain of an image signal that has been read and converts the image signal into a digital image signal; an image processing unit that applies image processing to the digital image signal; a source oscillation clock generating unit that generates a source oscillation clock; and a spread spectrum clock generating unit that generates a spread spectrum clock based on the source oscillation clock, wherein the image processing unit includes a former block that operates with the source oscillation clock and applies first image processing to an image signal inputted; and a latter block that receives asynchronously the image signal applied with the image processing in the former block, operates with the spread spectrum clock, and applies second image processing.

Yet another object of the present invention is to provide an image processing apparatus that includes a photoelectric converting unit that reads a script image; an analog front end unit that adjusts the offset and the gain of an image signal that has been read and converts the image signal into a digital image signal; an image processing unit that applies image processing to the digital image signal; a source oscillation clock generating unit that generates a source oscillation clock; and a spread spectrum clock generating unit that generates a spread spectrum clock based on the source oscillation clock, wherein the image processing unit includes a former block that operates with the source oscillation clock and applies first image processing to an image signal inputted; an external memory controller that receives asynchronously the image signal applied with the image processing in the former block and executes writing and reading to/from an external memory; and a latter block that operates with the spread spectrum clock, receives asynchronously the image signal read by the external memory controller, and applies second image processing.

Yet another object of the present invention is to provide an image processing apparatus that includes a second spread spectrum clock generating unit that generates a second spread spectrum clock having a frequency higher than that of the spread spectrum clock, wherein the external memory controller operates with the second spread spectrum clock.

Yet another object of the present invention is to provide an image processing apparatus wherein the image processing unit applies a shading correcting process, an input gamma correcting process, a color correcting process, an MTF correcting process, etc., to the digital image signal and the latter block applies at least the color correcting process.

Yet another object of the present invention is to provide an image processing apparatus wherein the image processing unit includes a controlling signal creating unit and creates a controlling signal that controls the photoelectric converting unit and the analog front end unit based on the source oscillation clock.

Yet another object of the present invention is to provide an image processing apparatus wherein the controlling signal creating unit supplies the source oscillation clock to the photoelectric converting unit and the analog front end unit and supplies the source oscillation clock returned from the photoelectric converting unit and the analog front end unit to the former block together with the digital image signal.

Yet another object of the present invention is to provide an image reading apparatus that includes the image processing apparatus.

Yet another object of the present invention is to provide an image forming apparatus that includes the image reading apparatus.

PREFERRED EMBODIMENTS OF THE INVENTION

Embodiments of the present invention will be described below referring to FIGS. 1 to 7.

First Embodiment

Figure 1:
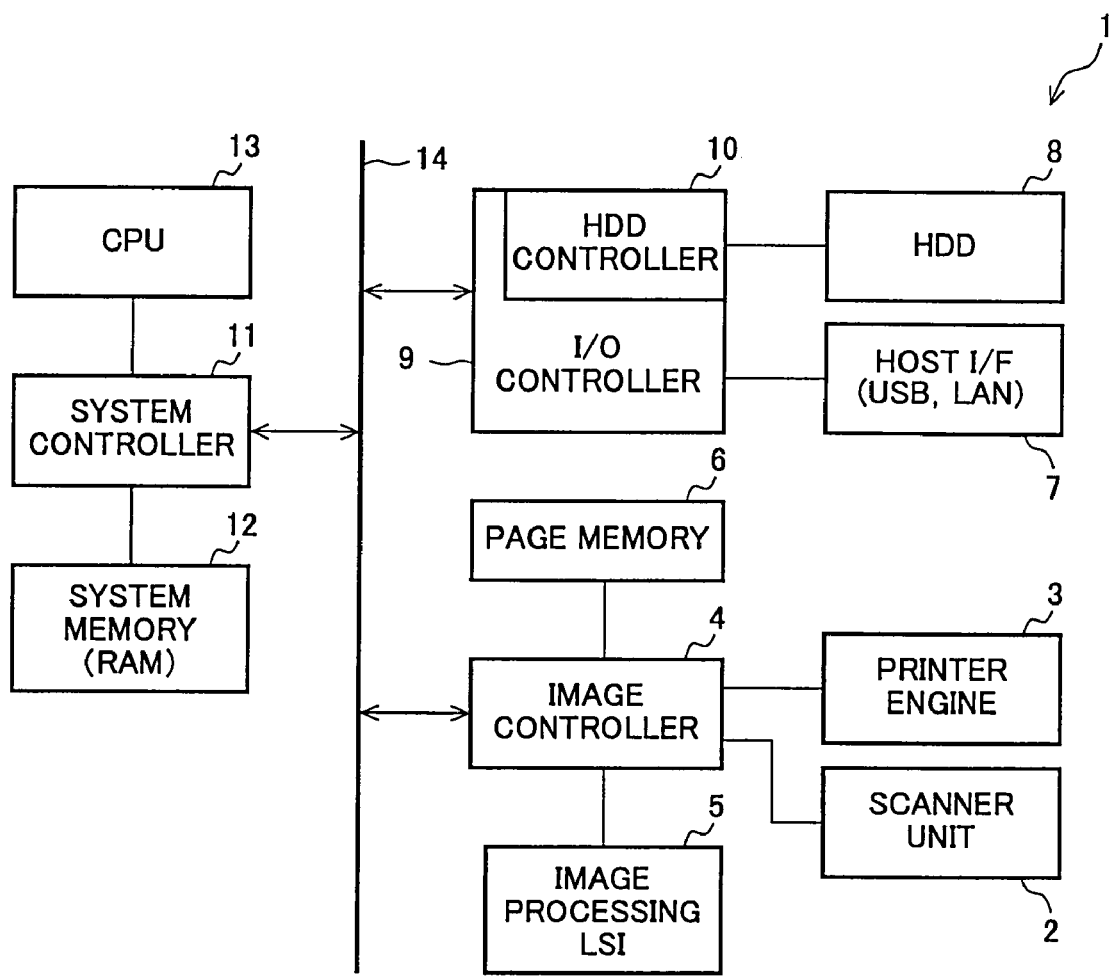
FIG. 1 is a block diagram of the entire configuration of an image forming apparatus applied with the present invention.

FIG. 1 is a block diagram of the entire configuration of an image forming apparatus applied with the present invention. FIG. 1 shows an example that employs a digital copying machine 1 as the image forming apparatus, and a scanner unit 2 and a printer engine 3 are respectively connected with an image controller 4 that executes image processing of an image that has been read. The image controller 4 with which an image processing LSI 5 and a page memory 6 are connected is connected with a system controller 11 through a PCI bus 14; can apply various types of processing treatment to the image read by the scanner unit 2; can cause the printer engine 3 to output a hard copy; and can cause the page memory 6 to store image data.

The digital copying machine 1 includes an I/O controller 9 that is connected with a host interface 7; is connectable with an external personal computer, an image forming apparatus, etc., through a USB, a LAN, etc.; can externally receive image data; and can also externally transmit image data. The digital copying machine 1 includes a hard disk (HDD) 8 that is connected through a hard disk (HDD) controller 10; can store image data read by the scanner unit 2 and image data inputted from the host interface 7; and can obtain image data from the hard disk (HDD) 8 and can cause the printer engine 3 to output a hard copy thereof.

The control of the entire digital copying machine 1 is executed through the PCI bus 14 by the system controller 11 controlled by a CPU 13 that operates based on a program stored in a system memory (RAM) 12. The image processing apparatus of the present invention relates to the internal configuration of the scanner unit 2 of the digital copying machine 1 shown in FIG. 1.

Figure 2:
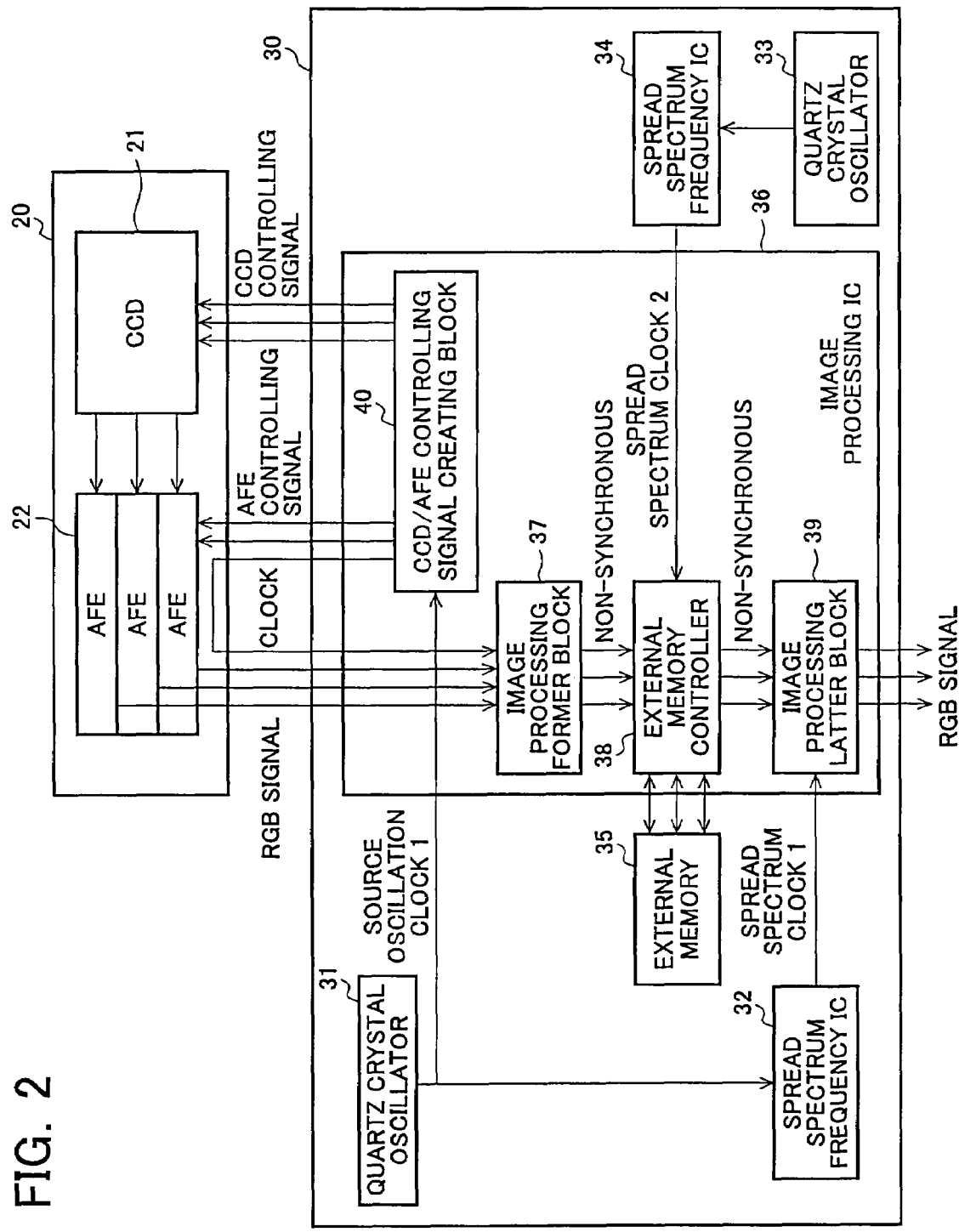
FIG. 2 is a block diagram of a first embodiment of an image processing apparatus.

FIG. 2 is a block diagram of a first embodiment of an image processing apparatus applied with the present invention. An image processing apparatus of the first embodiment includes a scanner section 20 that handles analog signals and an image processing section 30 that handles digital signals, and the sections 20 and 30 are mounted respectively on a CCD/AFE circuit board and an image processing board.

The scanner section 20 takes, for example, as a main scanning direction the longitudinal direction of a line sensor that uses a CCD (Charge Coupled Device) 21 that is a photoelectric converting unit; reads a script scanning the script based on a CCD controlling signal moving the line sensor in a sub scanning direction relative to the script; and outputs to an analog front end unit (hereinafter, "AFE") 22 an analog image signal including color signals respectively for red (R), green (G), and blue (B) for each line extending in the main scanning direction.

The AFE 22 adjusts the offset and the gain of the analog image signal read by the CCD 21 such that the white level and the black level of the analog image signal are matched with an input range of A/D conversion that follows, and converts using an A/D converter not shown the R, the G, and the B signals into, for example, a 10-bit digital image signal for each pixel.

The image processing section 30 is a section that creates a signal that supplies the digital image signal from the scanner section 20 to the printer engine 3, and includes a first quartz crystal oscillator 31, a first spread spectrum frequency IC 32, a second quartz crystal oscillator 33, a second spread spectrum frequency IC 34, an external memory 35, and an image processing IC 36 such as an ASIC (Application Specific Integrated Circuit). The image processing IC 36 includes an image processing former block (hereinafter, "former block") 37, an external memory controller 38, an image processing latter block (hereinafter, "latter block") 39, and a CCD/AFE controlling signal creating block 40. The first and the second spread spectrum frequency ICs 32 and 34 may be included in the image processing IC 36. Without providing the second spread spectrum IC 34 as a separate component, a spread spectrum clock at a proper frequency may be created by multiplying or dividing a first spread spectrum frequency. The quartz crystal oscillators correspond to the source oscillation clock generating unit of the present invention. The spread spectrum frequency ICs correspond to the spread spectrum clock generating unit of the present invention. The CCD/AFE controlling signal creating block corresponds to the controlling signal creating unit of the present invention.

Figure 3:
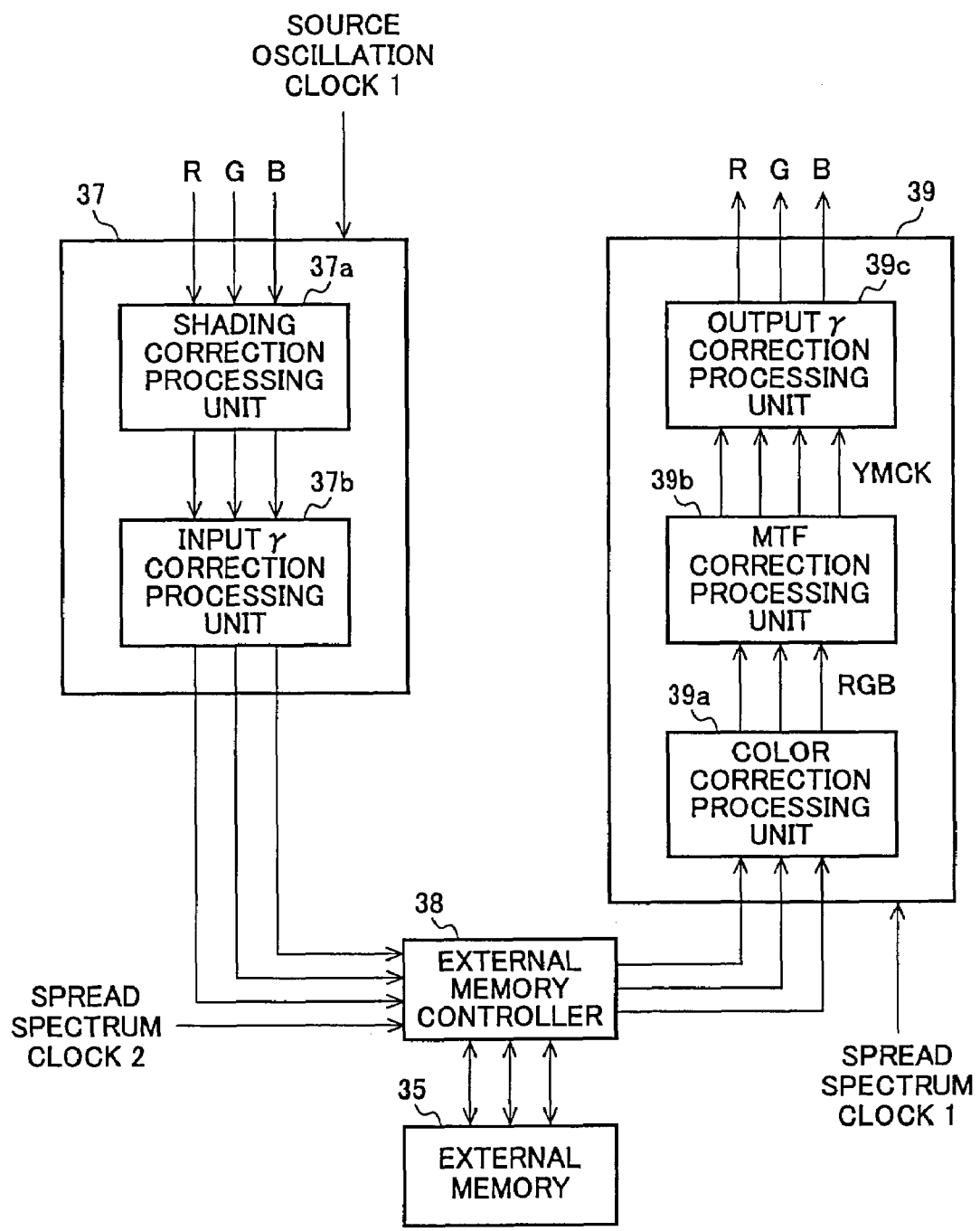
FIG. 3 shows the relevant part of the internal configuration of an image processing IC.

The image processing IC 36 is divided into the former block 37 and the latter block 39. The former block 37 and the latter block 39 apply a shading correcting process, an input gamma correcting process, line gap correction, a color correcting process, an MTF correcting process, an output gamma correcting process, etc., to an image signal to be processed. Among these processes, the color correcting process needs the timings at which the R, the G, and the B signals are respectively outputted to be matched and, therefore, needs to be executed by the latter block 39 that is a stage latter than a line gap correction processing unit not shown. Therefore, as shown in FIG. 3 as below, a shading correction processing unit 37a and an input gamma correction processing unit 37b are disposed in the former block 37, and a color correction processing unit 39a, an MTF correction processing unit 39b, and an output gamma correction processing unit 39c are disposed in the latter block 39. As described below, the line gap correction processing unit is realized by the external memory controller 38 and the external memory 35. The processes in the image processing IC 36 are not limited to the above processes and, when necessary, an input format converting process, a region separating process, a half-tone process, an unnecessary line detecting and replacing process, an output format converting process, etc., may be added.

FIG. 3 shows the relevant part of the internal configuration of the image processing IC. The shading correction processing unit 37a applies the shading correcting process that removes the light amount distribution, included in an image to be processed, due to various distortions caused by a lighting system, an image forming system, and a image shooting system of the scanner section 20 and converts the image to be processed into image data containing no light amount distribution.

The input gamma correction processing unit 37b applies the input gamma correction process that corrects the image to be processed to be linear with the sensitivity of the CCD such that the characteristics of the image to be processed that has been applied with the shading correcting process are easy to handle in image processing by the latter block 39.

The color correction processing unit 39a applies the color correcting process to RGB multi-valued data that has been applied with the input gamma correcting process and supplies the data to the MTF correction processing unit 39b that executes a filtering process. The color correction processing unit 39a corrects the color characteristic of the optical system and the photoelectric converting device (CCD) and improves the color characteristic to a predetermined color characteristic as that of the scanner unit 2 shown in the above FIG. 1.

The MTF correction processing unit 39b applies a two-dimensional FIR (Finite Impulse Response) filter to each pixel of the image to be processed from the color correction processing unit 39a and corrects the spatial frequency characteristic of the optical system and the line sensor.

The output gamma correction processing unit 39c corrects the characteristics of the image to be processed that has been applied with the MTF correcting process, and supplies to the block of latter part the image data applied with gray scale correction matched with the characteristics of blocks following the latter block 39. For example, in the case of copying, in the above FIG. 1, the image controller 4 applies image processing for the printer engine 3 using the image processing LSI 5 to the image applied with the above process by the scanner unit 2 and provides the image to the printer engine 3 as an output image.

The clocks will be described that operate each of the components of the scanner section 20 and the image processing section 30.

Figure 7:
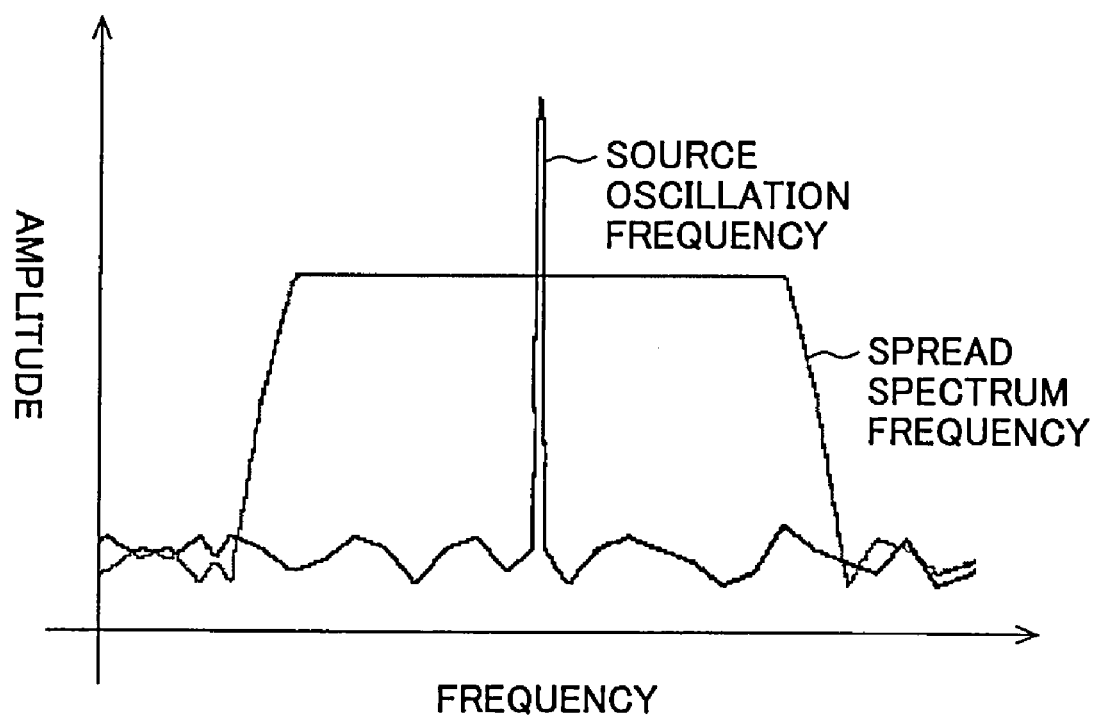
FIG. 7 shows frequency spectra respectively of a source oscillation clock and a spread spectrum clock formed by modulating the source oscillation clock with a predetermined frequency.

FIG. 7 shows frequency spectra respectively of the source oscillation clock and the spread spectrum clock formed by modulating the source oscillation clock with a predetermined frequency. The first quartz crystal oscillator 31 shown in FIG. 2 generates a source oscillation clock having a narrow frequency band and a high peak value and inputs the generated clock into the first spread spectrum frequency IC 32. The spread spectrum frequency IC 32 spreads a frequency spectrum as shown in FIG. 7 by slowly modulating the inputted source oscillation clock at a predetermined frequency and reduces the energy at the time of the peak. The above is similar for the second quartz crystal oscillator 33 and the second spread spectrum frequency IC 34. However, the frequency generated by the second quartz crystal oscillator 33 is higher than the frequency generated by the first quartz crystal oscillator 31.

In FIG. 2, the CCD/AFE controlling signal creating block in the image processing IC 36 is inputted with the source oscillation clock generated by the first quartz crystal oscillator 31 and creates a clock to operate the CCD controlling signal, an AFE controlling signal, and the former block 37. Commands from the image processing IC 36 side to the CCD 21 and the AFE 22, and data from the CCD 21 and the AFE 22 to the image processing IC 36 are clock signals synchronized with a clock at a specific frequency and, therefore, do not degrade the image quality. However, the signals are transferred using LVDS (Low Voltage Differential Signaling), that is, a differential signal at a low voltage in order to suppress unnecessary radiation from these cables.

Each of the AFE controlling signal outputted from the image processing IC 36 to the AFE 22 and the image signal inputted from the AFE 22 to the image processing IC 36 generates a delay in each transferring path thereof. Both of the amounts of the delays can be matched with each other by transferring a source oscillation clock that latches the inputted image signal in the same path as that of the image signal by causing the source oscillation clock to return to the image processing board through the CCD/AFE circuit board. Thereby, the former block 37 that receives the image signal from the AFE 22 is operated with the clock (source oscillation clock) at a specific frequency that is same as that of the analog circuit and, therefore, the image signal can be easily and securely latched. On the other hand, the latter block 39 is operated with the spread spectrum clock generated by the first spread spectrum frequency IC 32 and the spread spectrum clock is used partially and, thereby, EMI is suppressed. By disposing the external memory controller 38 between the former block 37 and the latter block 39, the transfer of the image signal from the former block 37 to the external memory controller 38 and the transfer of the image signal from the external memory controller 38 to the latter block 39 are respectively asynchronous transfer.

Figure 6A:
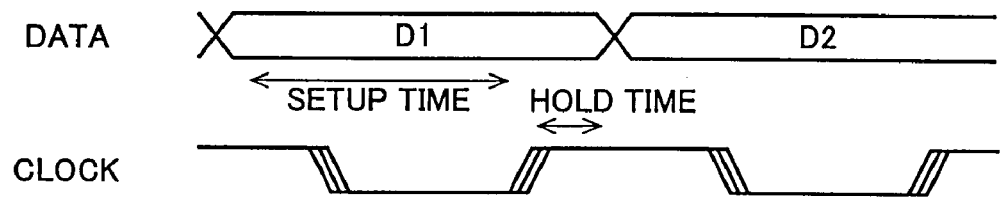
FIGS. 6A and 6B show the states where clocks latch an image signal.
Figure 6B:
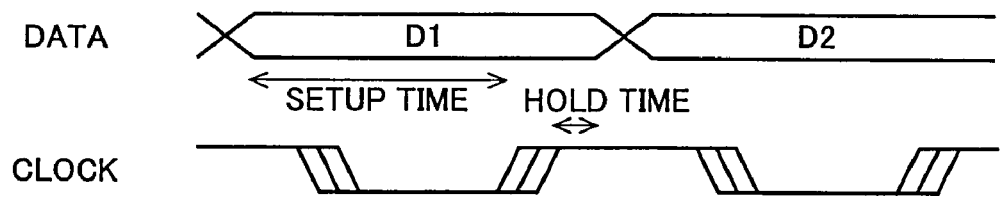

FIGS. 6A and 6B show the states where the image signal is latched by a clock. FIG. 6A shows the case where the clock is the source oscillation clock and FIG. 6B shows the case where the clock is the spread spectrum clock. In the present invention, the former block 37 and the CCD/AFE controlling signal creating unit 40 operate with the same source oscillation clock generated by the first quartz crystal oscillator 31 and, thereby, even in high-speed transfer, a longer setup time and a longer hold time can be secured more easily as shown in FIG. 6A than the case with the spread spectrum frequency clock shown in FIG. 6B. Therefore, the image signal can be securely latched.

For example, for a color copying machine, the lines that are read simultaneously by the three CCD line sensors respectively for R, G, and B in the scanner section 20 are different lines on the script. Therefore, obtained image signals have line gaps and an R, a G, and a B reading signals for the same line on the script are outputted being sequentially delayed respectively by predetermined lines as the scan in the sub scanning direction proceeds. Therefore, to unite the R, the G, and the B signals as an RGB signal for the same line by waiting for and match the delays, the external memory 35 that stores data of a plurality of lines is provided and the external memory controller 38 is provided between the former block 37 and the latter block 39.

Data read from and data written to the external memory 35 includes commands and communication of statuses in addition to the image data. Therefore, the average frequency of a clock supplied to the external memory controller 38 needs to be set to be higher than the frequency for image processing therebefore and thereafter, and transfer between the image processing therebefore and thereafter and the external memory controller 38 also needs to be asynchronous.

Therefore, in the example shown in FIG. 2, the second quartz crystal oscillator 33 and the second spread spectrum frequency IC 34 are provided that generate a frequency higher than the clock frequency generated by the first quartz crystal oscillator 31 and the first spread spectrum frequency IC 32 and, thereby, the higher-frequency spread spectrum clock generated by the second spread spectrum frequency IC 34 is supplied to the external memory controller 38. When a function of asynchronous transferring unit for delivering from the specific-frequency clock to the spread spectrum clock is combined with the external memory controller 38 disposed between the former block 37 and the latter block 39, no asynchronous transferring unit needs to be provided separately. An asynchronous circuit is generally complicated and difficult to design and, therefore, it is preferable not to add the circuit.

Second Embodiment

Figure 4:
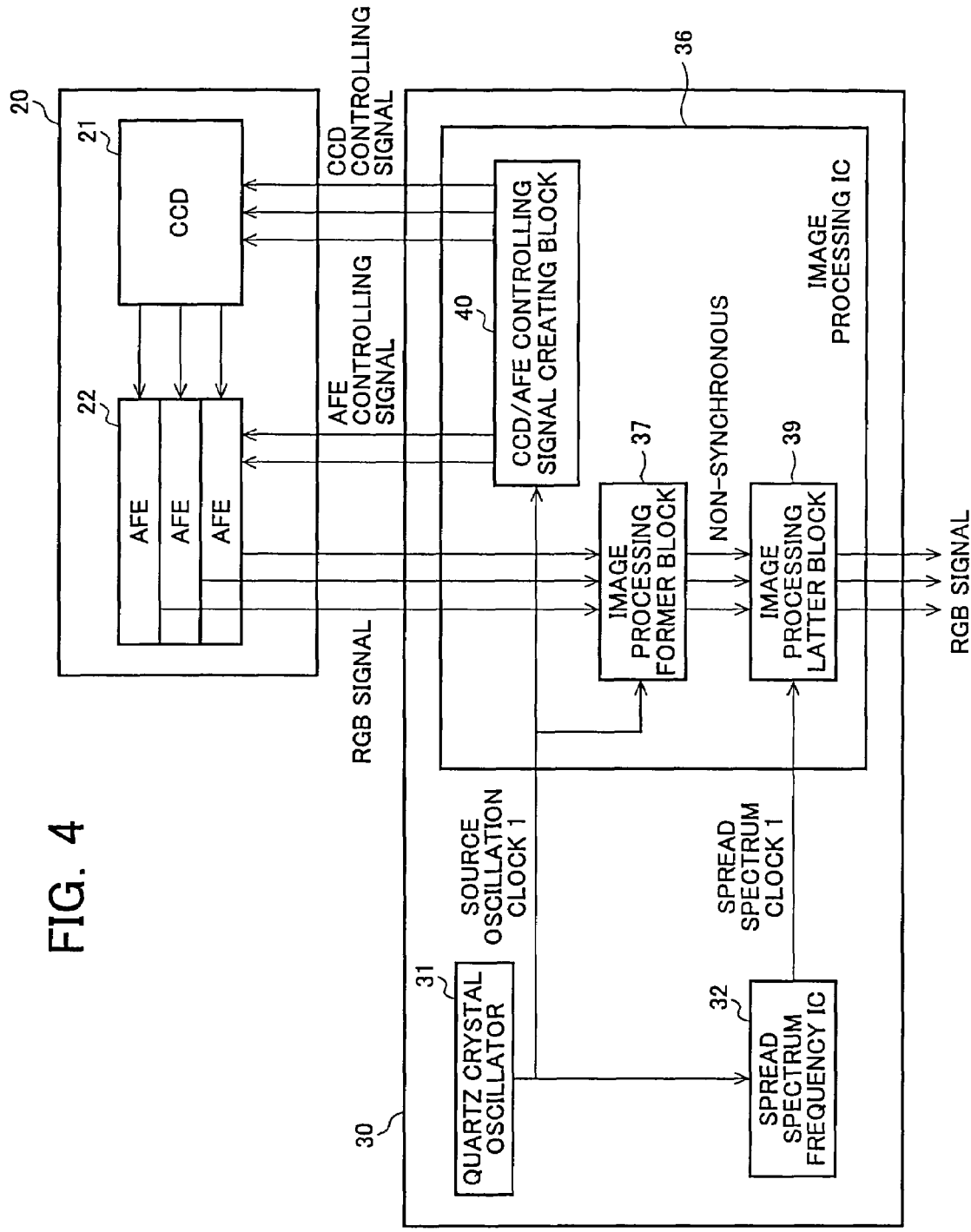
FIG. 4 is a block diagram of a second embodiment of the image processing apparatus.

FIG. 4 is a block diagram of a second embodiment of the image processing apparatus. The image processing apparatus of the second embodiment includes a scanner section 20 and an image processing section 30. The scanner section 20 has the same configuration as that of the image processing apparatus of the first embodiment. The image processing section 30 includes a quartz crystal oscillator 31, a spread spectrum frequency IC 32, and an image processing IC 36 such as an ASIC. Though the image processing IC 36 includes a former block 37, a latter block 39, and a CCD/AFE controlling signal creating block 40, the IC 36 does not include the external memory controller and the second spread spectrum frequency IC that are included in the image processing apparatus of the first embodiment. Processes applied to the image data in the former block 37 and the latter block 39 are same as the processes in the image processing apparatus of the first embodiment.

In the image processing apparatus of the second embodiment, a source oscillation clock generated by the quartz crystal oscillator 31 is supplied to the CCD/AFE controlling signal creating block 40; a CCD controlling signal created by the CCD/AFE controlling signal creating block 40 is supplied to a CCD 21; and an AFE controlling signal is supplied to an AFE 22. The source oscillation clock generated by the quartz crystal oscillator 31 is supplied to the former block 37 and facilitates latching of an input signal from the AFE 22. The latter block 39 of the image processing IC 36 is supplied with a spread spectrum clock generated by the spread spectrum frequency IC 32 and, thereby, EMI is suppressed. Data transfer from the former block 37 to the latter block 39 is asynchronous.

Third Embodiment

Figure 5:
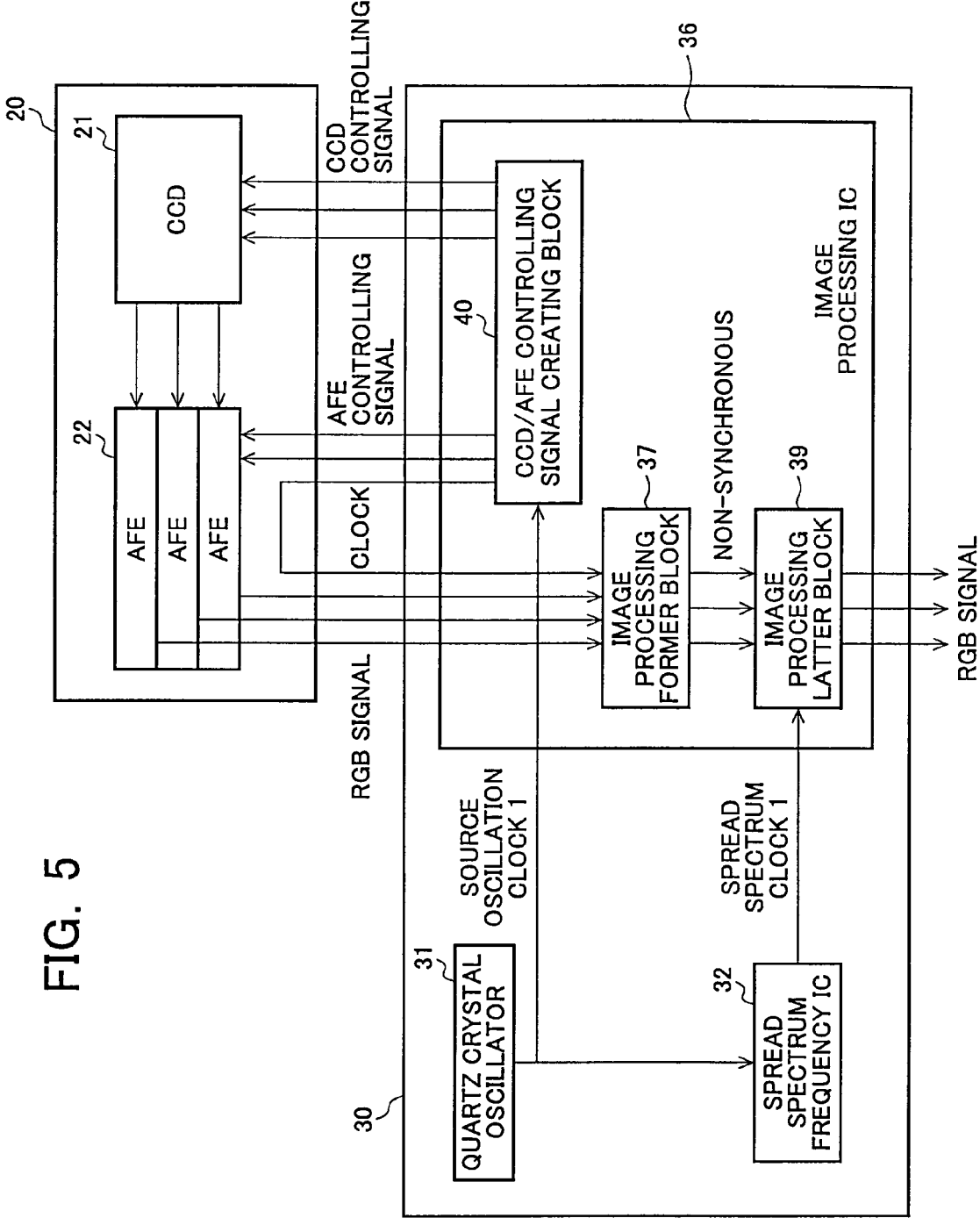
FIG. 5 is a block diagram of a third embodiment of the image processing apparatus.

FIG. 5 is a block diagram of a third embodiment of the image processing apparatus. The image processing apparatus of the third embodiment includes a scanner section 20 and an image processing section 30. The configuration of the scanner section 20 and the image processing section 30 is same as that of the image processing apparatus of the first embodiment. Processes applied to the image data in the former block 37 and the latter block 39 are also same as the processes in the image processing apparatus of the first or the second embodiment.

In the image processing apparatus of the third embodiment, a source oscillation clock generated by the quartz crystal oscillator 31 is supplied to the CCD/AFE controlling signal creating block 40; a CCD controlling signal created by the CCD/AFE controlling signal creating block 40 is supplied to a CCD 21; and an AFE controlling signal is supplied to an AFE 22. As to the clock supplied to the former block 37, the delay amount of the source oscillation clock in latching the inputted image signal can be matched with the delay amount of the image signal by causing the source oscillation clock to return to the image processing board through circuit boards of the CCD 21 and the AFE 22.

In the image processing apparatus of the third embodiment, the clock supplied to the former block 37 is also a clock formed by delaying the source oscillation clock generated by the quartz crystal oscillator 31 by a predetermined amount and, therefore, facilitates latching of the inputted signal from the AFE 22. A spread spectrum clock generated by the spread spectrum frequency IC 32 is supplied to the latter block 39 and EMI is suppressed by using the spread spectrum clock. Data transfer from the former block 37 to the latter block 39 is asynchronous.

According to the present invention, the following effects can be obtained.

The present invention is adapted to divide an image processing block in an image processing IC such as, for example, an ASIC into two blocks of a former block and a latter block and to have the former block operated with a source oscillation clock and the latter block operated with a spread spectrum frequency clock and, therefore, can facilitate reduction of image noises and reduction of EMI. By operating the former block and the CCD/AFE controlling signal creating unit with the same source oscillation clock, securing of a setup time and a hold time can be easier than the case where the spread spectrum frequency clock is used even in high-speed transferring and, therefore, data can be latched easily and securely.

It is advantageous that data transfer between a former block and a latter block is asynchronous transfer that can deliver the data stably even in high-speed transfer. When an external memory controller is provided, because a controlling signal is communicated with the external memory in addition to the data, the clock frequency of the external memory controller is made higher than the frequency of the blocks around the controller and, thereby, transfer is often executed with the block around asynchronously. The present invention employs the configuration that divides the apparatus into a former block and a latter block sandwiching an external memory controller therebetween and the external memory controller can also act as an asynchronous transferring circuit between the former block and the latter block and, therefore, any asynchronous transferring circuit that is complicated and is difficult to design does not need to be provided especially.

The present invention includes a controlling signal creating unit that creates a controlling signal that controls a photoelectric converting unit and an analog front end unit based on the source oscillation clock that drives the former block and, therefore, a high-precision controlling signal can be supplied to the photoelectric converting unit and the analog front end unit based on the source oscillation clock.

The controlling signal creating unit of the present invention supplies the source oscillation clock that drives the former block to the circuit board sides of the photoelectric converting unit and the analog front end unit and inputs the source oscillation clock returned from the circuit board of the photoelectric converting unit and the analog front end unit into the former block together with the inputted image signal. Therefore, respective amounts of delay of the inputted image signal and the source oscillation clock can be matched with each other.

The invention claimed is:

1. An image processing apparatus comprising:
a photoelectric converting unit that reads a script image;
an analog front end unit that adjusts the offset and the gain of an image signal that has been read and converts the image signal into a digital image signal;
an image processing unit that applies image processing to the digital image signal;
a source oscillation clock generating unit that generates a source oscillation clock; and
a spread spectrum clock generating unit that generates a spread spectrum clock based on the source oscillation clock, wherein
the image processing unit comprises:
a former block that operates with the source oscillation clock and applies first image processing to an image signal inputted; and
a latter block that receives asynchronously the image signal applied with the image processing in the former block, operates with the spread spectrum clock, and applies second image processing.

2. An image processing apparatus comprising:
a photoelectric converting unit that reads a script image;
an analog front end unit that adjusts the offset and the gain of an image signal that has been read and converts the image signal into a digital image signal;
an image processing unit that applies image processing to the digital image signal;
a source oscillation clock generating unit that generates a source oscillation clock; and
a spread spectrum clock generating unit that generates a spread spectrum clock based on the source oscillation clock, wherein
the image processing unit comprises:
a former block that operates with the source oscillation clock and applies first image processing to an image signal inputted;
an external memory controller that receives asynchronously the image signal applied with the image processing in the former block and executes writing and reading to/from an external memory; and
a latter block that operates with the spread spectrum clock, receives asynchronously the image signal read by the external memory controller, and applies second image processing.

3. The image processing apparatus as defined in claim 2, comprising a second spread spectrum clock generating unit that generates a second spread spectrum clock having a frequency higher than that of the spread spectrum clock, wherein the external memory controller operates with the second spread spectrum clock.

4. The image processing apparatus as defined in claim 1, wherein the image processing unit applies a shading correcting process, an input gamma correcting process, a color correcting process, an MTF correcting process, etc., to the digital image signal and the latter block applies at least the color correcting process.

5. The image processing apparatus as defined in claim 1, wherein the image processing unit comprises a controlling signal creating unit and creates a controlling signal that controls the photoelectric converting unit and the analog front end unit based on the source oscillation clock.

6. The image processing apparatus as defined in claim 5, wherein the controlling signal creating unit supplies the source oscillation clock to the photoelectric converting unit and the analog front end unit and supplies the source oscillation clock returned from the photoelectric converting unit and the analog front end unit to the former block together with the digital image signal.

7. An image reading apparatus comprising the image processing apparatus as defined in claim 1.

8. An image forming apparatus comprising the image reading apparatus as defined in claim 7.

9. The image processing apparatus as defined in claim 2, wherein the image processing unit applies a shading correcting process, an input gamma correcting process, a color correcting process, an MTF correcting process, etc., to the digital image signal and the latter block applies at least the color correcting process.

10. The image processing apparatus as defined in claim 2, wherein the image processing unit comprises a controlling signal creating unit and creates a controlling signal that controls the photoelectric converting unit and the analog front end unit based on the source oscillation clock.

11. An image reading apparatus comprising the image processing apparatus as defined in claim 2.

* * * * *